US00RE39635E

(19) United States
(12) Reissued Patent
Vanderlaan et al.

(10) Patent Number: US RE39,635 E
(45) Date of Reissued Patent: May 15, 2007

(54) OPTICALLY TRANSPARENT HYDROGELS AND PROCESSES FOR THEIR PRODUCTION

(76) Inventors: Douglas G. Vanderlaan, 8114 Parkridge Cir., S., Jacksonville, FL (US) 32211; Frank Molock, 1543 Wildfern Dr., Orange Park, FL (US) 32073; Giancarlo Fruzzetti, 1601 Declaration Dr., Jacksonville, FL (US) 32250

(21) Appl. No.: 10/085,261

(22) Filed: Feb. 28, 2002

Related U.S. Patent Documents

Reissue of:
(64) Patent No.: 6,031,059
Issued: Feb. 29, 2000
Appl. No.: 09/163,693
Filed: Sep. 30, 1998

(51) Int. Cl.
*C08F 30/08* (2006.01)

(52) U.S. Cl. ..... 526/279; 522/99; 525/383
(58) Field of Classification Search ..... 526/279; 522/99; 525/383
See application file for complete search history.

(56) References Cited

U.S. PATENT DOCUMENTS

| | | | | |
|---|---|---|---|---|
| 3,935,342 A | | 1/1976 | Lim | |
| 4,136,250 A | | 1/1979 | Mueller et al. | 528/29 |
| 4,182,822 A | | 1/1980 | Chang | 526/279 |
| 4,260,725 A | | 4/1981 | Keogh et al. | |
| 4,261,875 A | | 4/1981 | LeBoeuf | |
| 4,294,974 A | * | 10/1981 | LeBoeuf | 556/440 |
| 4,332,922 A | | 6/1982 | Kossmehl et al. | |
| 4,419,505 A | | 12/1983 | Ratkowski et al. | |
| 4,481,322 A | | 11/1984 | Godlewski et al. | |
| 4,486,577 A | | 12/1984 | Mueller et al. | |
| 4,525,563 A | * | 6/1985 | Shibata et al. | 526/279 |
| 4,575,546 A | | 3/1986 | Klemarczyk et al. | |
| 4,649,184 A | | 3/1987 | Yoshikawa et al. | |
| 5,010,141 A | | 4/1991 | Mueller | |
| 5,057,578 A | | 10/1991 | Spinelli | |
| 5,314,960 A | | 5/1994 | Spinelli et al. | |
| 5,336,797 A | | 8/1994 | McGee et al. | |
| 5,371,147 A | | 12/1994 | Spinelli et al. | |

FOREIGN PATENT DOCUMENTS

| | | |
|---|---|---|
| EP | 0 030 807 | 6/1981 |
| JP | 19860214688 | 3/1988 |

* cited by examiner

*Primary Examiner*—Margaret G. Moore

(57) ABSTRACT

The invention provides hydrogels for use in the production of biomedical devices. In particular, the invention provides hydrogels formed from siloxane prepolymers and a hydrophilic monomer, which hydrogels are optically transparent.

21 Claims, No Drawings

OPTICALLY TRANSPARENT HYDROGELS AND PROCESSES FOR THEIR PRODUCTION

Matter enclosed in heavy brackets [ ] appears in the original patent but forms no part of this reissue specification; matter printed in italics indicates the additions made by reissue.

*This application is a Reissue of U.S. appln. No. 09/163,693, now issued as U.S. Pat. No. 6,031,059.*

FIELD OF THE INVENTION

The invention relates to hydrogels for use in the production of biomedical devices. In particular, the invention provides hydrogels formed from siloxane prepolymers and a hydrophilic monomer, which hydrogels are optically transparent.

BACKGROUND OF THE INVENTION

The use of hydrogels for the manufacture of biomedical devices is known. Hydrogels that are copolymers of siloxane prepolymers and hydrophilic monomers offer certain advantages in comparison with conventional hydrogels. However, it is difficult to produce optically transparent, homogeneous hydrogels from these prepolymers and monomers making the use of the hydrogels limited.

Known methods for making homogeneous hydrogels from siloxane prepolymers include using diluents to compatabilize the siloxane with the hydrophilic monomer and using siloxanes into which hydrophilic groups are incorporated. However, the use of diluents is disadvantageous because of their volatility and their use may result in polymers of inferior quality. Incorporation of hydrophilic groups is disadvantageous in that it requires the use of complicated syntheses and the resulting polymer may not be optically transparent. Therefore, a need exists for a method of polymerizing siloxane prepolymers and hydrophilic monomers that overcome these disadvantages.

DESCRIPTION OF THE INVENTION AND PREFERRED EMBODIMENTS

It is a discovery of the invention that homogeneous, optically transparent hydrogels can be formed from the polymerization of siloxane prepolymers and/or monomers with a hydrophilic monomer without incorporation of hydrophilic groups into the siloxane and with a reduction in the amount of diluents needed or, in some cases, without the use of diluents. The hydrogels of the invention are useful in the manufacture of biomedical devices, meaning devices designed to be used while in or on either or both human tissue or fluid. Examples of such devices include, without limitation, stents, implants, catheters, and ophthalmic lenses. In a preferred embodiment, the biomedical device is an ophthalmic lens including, without limitation, contact or intraocular lenses. More preferably, the device is a contact lens.

In one embodiment, the invention provides a process for producing hydrogels comprising, consisting essentially of, and consisting of the steps of a.) polymerizing a hydrophobic siloxane prepolymer, a silylated hydrophilic monomer, and optionally a hydrophobic siloxane monomer to form a polymer; and b.) hydrolyzing the polymer. In another embodiment, the invention provides a hydrogel comprising, consisting essentially of, and consisting of a hydrophobic siloxane prepolymer, a silylated hydrophilic monomer, and optionally a hydrophobic siloxane monomer.

By "hydrophobic siloxane prepolymer" and "hydrophobic siloxane monomer" is meant a siloxane prepolymer or siloxane monomer, respectively, that does not have an amount of hydrophilic groups, such as a hydroxyl group, incorporated into the main chain or a side chain to allow for blends to be made of it with a hydrophilic monomer absent the use of high levels of diluent. Suitable hydrophobic siloxane prepolymers are of the formula:

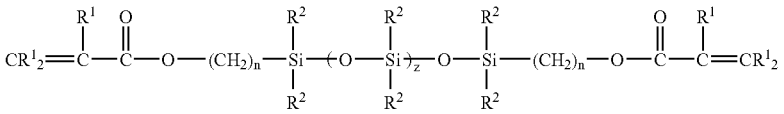

(I)

wherein $R^1$ is hydrogen or an alkyl of 1 to 5 carbon atoms, $R^2$ is an alkyl of 1 to 5 carbon atoms, n=1 to 12, and z=1 to 500. Preferably, the prepolymer is a macromer, such as:

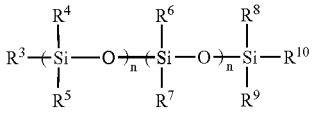

(A)

wherein n and m are each independently 0 to 500 and (n+m)=10 to 500, $R^4$, $R^6$, $R^7$, $R^8$, and $R^9$ are each independently a monovalent alkyl of 1 to 5 carbon atoms, or aryl group that may be further substituted with alcohol, ester, amine, ketone, carboxylic acid, or ether groups, and $R^3$, $R^5$, and $R^{10}$ are each independently a monovalent alkyl or 1 to 5 carbon atoms or aryl group that may be further substituted with alcohol, ester, amine, ketone, carboxylic acid or ether groups or have the structure:

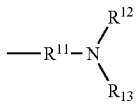

(B)

providing that at least one of $R^3$, $R^5$, and $R^{10}$ are according to this structure wherein $R^{11}$ is a divalent alkyl group of 1 to 5 carbon atoms, $R^{12}$ and $R^{13}$ are independently H, a monovalent alkyl of 1 to 5 carbon atoms or aryl group that may be further substituted with an alcohol, ester, amine, ketone, carboxylic acid or ether group, or have the structure:

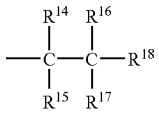

(C)

wherein $R^{16}$ is H or a monovalent polymerizable group containing acryloyl, methacryloyl, styryl, vinyl, allyl, or N-vinyl lactam; $R^{18}$ is H, a monovalent alkyl of 1 to 5 carbon atoms or aryl group that can be further substituted with alcohol, ester, amine, ketone, carboxylic acid, or ether groups, or a polymerizable group containing acrylate, methacrylate, styryl, vinyl, allyl or N-vinyl lactam; $R^{14}$, $R^{15}$, and $R^{16}$ are independently H, or a monovalent alkyl of 1 to 5 carbon atoms or aryl that can be further substituted with alcohol, ester, amine, ketone, carboxylic acid or ether groups, or $R^{14}$ and $R^{17}$, or $R^{17}$ and $R^{15}$ can be bonded to form a ring structure, providing that at least one of the Structure B groups on the monomer contains polymerizable groups. Preparation of such macromers is known in the art.

Preferred hydrophobic prepolymers are α,ω-bismethacryloxypropyl macromers. More preferred is α,ω-bismethacryloxypropyl polydimethylsiloxane. Other hydrophilic prepolymers that can be used include linear or branched polymers or copolymers made from hydrophobic monomers such as 3-methacryloxypropyltris (trimethylsiloxy)silane, said prepolymers having polymerizable functional groups such as methacrylate or styryl. Preparation of such prepolymers is described in U.S. Pat. Nos. 5,010,141; 5,057,578; 5,314,960; 5,371,147 and 5,336,797 incorporated in their entireties herein by reference.

In the process of the invention, the prepolymer may be used alone or in combination with a hydrophobic siloxane monomer. Hydrophobic siloxane monomers useful in the invention are of the formula:

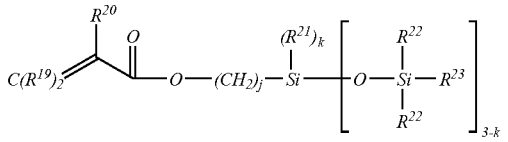

wherein $R^{19}$ and $R^{20}$ are each independently hydrogen or methyl, $R^{21}$, $R^{22}$, and $R^{23}$ are each independently a monovalent alkyl of 1 to 5 carbon atoms or aryl, j=1 to 10 and k=0 to 3. Examples of useful siloxane monomers include, without limitation, polysiloxyanylalkyl(meth)acrylates, preferably, 3-methacryloxypropyltris(trimethylsiloxy)silane or 3-methacryloxypropylbis(trimethylsiloxy)methylsilane. Hydrophobic siloxane monomers useful in the invention are commercially available or may be synthesized through known methods.

In the process of the invention, the siloxane prepolymer alone, or in combination with the siloxane monomer, is polymerized with a silylated hydrophilic monomer. Any known hydrophilic monomer capable of being silylated may be used. Preferably, the silylated monomer used is of the formula:

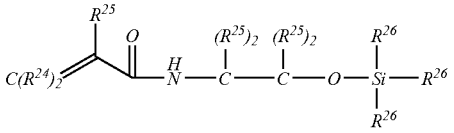

wherein $R^{24}$ is hydrogen or methyl, $R^{25}$ is hydrogen or methyl, and $R^{26}$ is a monoalkyl, preferably methyl. More preferably, the silylated monomer is a polyalkylsilyl ether of a hydroxyalkyl(meth)acrylamide or a polyalkylsilyl ether of a hydroxyl styrene or of a hydroxy alkyl styrene. Most preferably, the silylated monomer is 2-hydroxymethacrylamide trimethylsilyl ether.

The silylated monomer may be prepared by silylating the hydroxyl groups of a hydrophilic monomer by any known method. For example, the hydroxyl groups may be reacted with a silylating agent such as a trialkylsilyl halogenide, hexamethyldisilizane, trimethylsilyldiethylamine, or the like. Solvents and catalysts useful in the silylation, as well as reaction conditions, are well known in the art.

The siloxane prepolymer, alone or in combination with a siloxane monomer, are polymerized with the silylated hydrophilic monomer by any convenient method, including without limitation, heat, ultraviolet light, radiation polymerization, or a combination thereof. Preferably, the polymerization is carried out in the presence of a suitable initiator present in an amount of about 0.01 to about 2.0 weight percent based on the weight of the reactants. More preferably, the polymerization is carried out with UV light using a UV polymerization initiator. The preferred UV polymerization initiator is 2-hydroxy-2-methyl- 1-phenyl-propan-1-one.

The amount of siloxane prepolymer used is about 0 to about 90 weight percent, preferably about 5 to about 70 weight percent, based on the weight of the polymerizable components. The amount of siloxane monomer used is from about 0 to about 70 weight percent, preferably from about 0 to about 40 weight percent. The amount of silylated monomer used is from about 2 to about 60 weight percent, preferably from about 15 to about 50 weight percent.

After polymerization is completed to the desired degree, the resulting polymer may be washed in an organic solvent to remove unreacted reactants. Suitable solvents include, without limitation, hexane, ethanol, isopropyl alcohol, n- and t-butyl alcohol, n-amyl alcohol, n-hexyl alcohol, as well as chlorinated solvents and the like, and mixtures thereof.

The polymer then may be desilylated by hydrolyzing to eliminate the silyl groups and to regenerate the hydroxyl group. The hydrolysis may be carried out in any suitable hydrolyzing agent. Preferably, hydrolysis is carried out by placing the lenses in a borate-buffered saline solution. Optionally, an acid or base may be used in the hydrolyzing agent to speed the hydrolysis.

One ordinarily skilled in the art will recognize that any number of a wide variety of additional components may be added to the mixture to be polymerized. Examples of such additives include, without limitation, ultra-violet absorbers, antioxidants, tints, and the like.

Any molding process may be used to form lenses from the hydrogels of the invention. For example, the siloxane prepolymer, silylated hydrophilic monomer and, optionally, the hydrophobic monomer may be blended together along with a polymerization initiator and the blend then placed into a lens mold. After polymerization is completed, the lens undergoes desilylation.

The invention will be clarified further by a consideration of the following, non-limiting examples.

EXAMPLES

Example 1

214.2 g methacryloyl chloride were added dropwise to a solution of 128 g methanol, 249 g potassium carbonate, and 122.2 g ethanolamine in a three-necked flask cooling to between 5 and 15° C. in an ice bath. Addition took approximately 3 hours after which the reaction mixture was left to stir for approximately 2 days after removal of the ice bath. The reaction mixture was poured into $CH_2Cl_2$ and vacuum filtered to remove all solids, which solids were rinsed with $CH_2Cl_2$. The liquid was inhibited with 100 ppm hydroquinone monomethyl ether and the solvent removed by rotary evaporation. Residual oil was distilled under reduced pressure in a distilling flask equipped with an air ebulator, after addition of 150 ppm CuCl. 56.62 g of hydroxyethyl methacrylamide was removed as a light yellow liquid at 0.5 mm Hg and 125 to 135° C. Air was bubbled through the distilled product.

23 g trimethylsilyl chloride were added dropwise over an approximately 2 hour period to a solution of 25.3 g of the above product, 30.6 g triethylamine and 75 ml $CH_2Cl_2$ in a three-necked flask equipped with a drying tube and a magnetic stirrer. The mixture was kept at room temperature. After the addition, the reaction mixture was heated to 40° C. and stirred for approximately 5 hours. The mixture was then filtered to remove salt and the residual liquid was then rotovapped until the weight ceased to fall. The product was distilled under reduced pressure after addition of 500 ppm HQMME. 2-hydroxyethylmethacrylamide trimethylsilyl ether ("TMS-HMA") was collected as a clear liquid at 95 to 105° C. and 0.25 mm Hg in a yield of 42 percent.

Example 2

A blend was made of 20 parts of α,ω-bismethacryloxypropyl polydimethylsiloxane (5,000 average molecular wt), 45 parts of the TMS-HMA of Example 1 and 34 parts 3-methacryloxypropyltris(trimethylsiloxy) silane ("TRIS"), 1 part DAROCUR™ 1173, a photoinitiator that is 2-hydroxy-2-methyl-1-phenylproan-1-one, and 11 parts t-butanol. The blend was placed in polypropylene lens molds and irradiated for 30 min with UV light, then released in ethanol, and transferred into a borate buffered saline to produce soft, optically clear, oxygen permeable contact lenses.

What is claimed is:

1. A process for producing a hydrogel comprising:

a.) polymerizing a hydrophobic siloxane prepoplymer and a silylated hydrophilic monomer; and b.) hydrolyzing the resulting polymer wherein the step a.) polymerizing is carried out by using one of heat polymerization, ultraviolet light polymerization, radiation polymerization, or a combination thereof.

2. The process of claim 1 wherein the hydrophobic siloxane prepolyer and the silylated hydrophilic monomer are polymerized with a hydrophobic siloxane monomer.

3. The process of claim 2 wherein the hydrophobic siloxane monomer is of the formula:

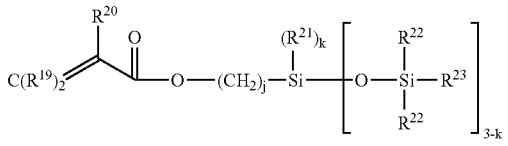

wherein $R^{19}$ and $R^{20}$ are each independently hydrogen or methyl, $R^{21}$, $R^{22}$, and $R^{23}$ are each independently a monovalent alkyl of 1 to 5 carbon atoms or aryl, j=1 to 10 and k=0 to 3.

4. The process of claim 3, wherein the hydrophobic siloxane monomer is 3-methacryloxypropyltris (trimethylsiloxy)silane or 3-methacryloxypropylbis (trimethylsiloxy)methylsilane.

5. The process of claim 1 or 3 wherein the hydrophobic siloxane prepolymer is of the formula:

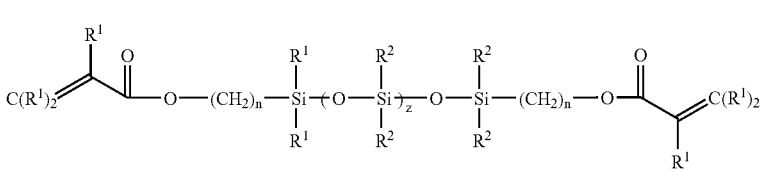

(I)

wherein $R^1$ is hydrogen or an alkyl of 1 to 5 carbon atoms, $R^2$ is an alkyl of 1 to 5 carbon atoms, n=1 to 12, and z=1 to 500 and the silylated hydrophilic monomer is of the formula:

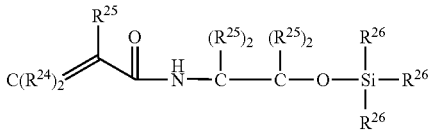

(III)

wherein $R^{24}$ is hydrogen or methyl, $R^{25}$ is hydrogen or methyl, and $R^{26}$ is a monoalkyl.

6. The process of claim 5 wherein the hydrophobic siloxane prepolymer is a α,ω-bismethacryloxypropyl macromer and the silylated hydrophilic monomer is a polyalkylsilyl ether of a hydroxyalkyl(meth)acrylamide.

7. The process of claim 6 wherein the hydrophobic siloxane prepolymer is α,ω-bismethacryloxypropyl polydimethylsiloxane and the silylated hydrophilic monomer is 2-hydroxymethacrylamide trimethylsilyl ether.

8. A hydrogel comprising a hydrophobic siloxane prepolymer and a silylated hydrophilic monomer.

9. The hydrogel of claim 8 further comprising a hydrophobic siloxane monomer.

10. The hydrogel of claim 9 wherein the hydrophobic siloxane monomer is of the formula:

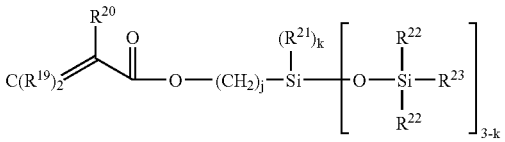

wherein $R^{19}$ and $R^{20}$ are each independently hydrogen or methyl, $R^{21}$, $R^{22}$, and $R^{23}$ are each independently a monovalent alkyl of 1 to 5 carbon atoms or aryl, j=1 to 10 and k=0 to 3.

11. The hydrogel of claim 10, wherein the hydrophobic siloxane monomer is 3-methacryloxypropyltris (methylsiloxy)silane or 3-methacryloxypropylbis (trimethylsiloxy)methylsilane.

12. The hydrogel of claim 8 or 10 wherein the hydrophobic siloxane prepolymer is of the formula:

(I)

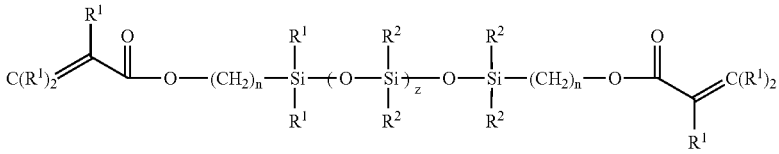

wherein $R^1$ is hydrogen or an alkyl of 1 to 5 carbon atoms, $R^2$ is an alkyl of 1 to 5 carbon atoms, n=1 to 12, and z=1 to 500 and the silylated hydrophilic monomer is of the formula:

(III)

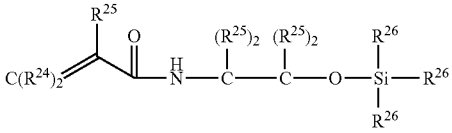

wherein $R^{24}$ is hydrogen or methyl, $R^{25}$ is hydrogen or methyl, and $R^{26}$ is a monoalkyl.

13. The hydrogel of claim 12 wherein the hydrophobic siloxane prepolymer is a α,ω-bismethacryloxypropyl macromer and the silylated hydrophilic monomer is a polyalkylsilyl ether of a hydroxyalkyl(meth)acrylamide.

14. The hydrogel of claim 13 wherein the hydrophobic siloxane prepolymer is α,ω-bismethacryloxypropyl polydimethylsiloxane and the silylated hydrophilic monomer is 2-hydroxymethacrylamide trimethylsilyl ether.

15. The hydrogel of claim 8 wherein the hydrophobic siloxane prepolymer is present in an amount of about 5 to about 70 weight percent and the amount of silylated hydrophilic monomer is present in an amount of about 2 to about 60 weight percent.

16. The hydrogel of claim 9 wherein the amount of siloxane prepolymer used is about 5 to about 70 weight percent, the amount of siloxane monomer used is from about 0 to about 70 weight percent, and the amount of silylated monomer used is from about 2 to about 60 weight percent.

17. The process of claim 1, wherein the polymerizing step a.) is carried out using ultraviolet light.

18. The process of claim 5, wherein the polymerizing step a.) is carried out using ultraviolet light.

19. The process of claim 6, wherein the polymerizing step a.) is carried out using ultraviolet light.

20. The hydrogel of claim 13 wherein the amount of siloxane prepolymer used is about 5 to about 70 weight percent, the amount of siloxane monomer used is from about 0 to about 70 weight percent, and the amount of silylated monomer used is from about 2 to about 60 weight percent.

21. The hydrogel of claim 14 wherein the amount of siloxane prepolymer used is about 5 to about 70 weight percent, the amount of siloxane monomer used is from about 0 to about 70 percent, and the amount of silylated monomer used is from about 2 to about 60 weight percent.

* * * * *